(12) United States Patent
Ramanujan et al.

(10) Patent No.: US 6,169,565 B1
(45) Date of Patent: Jan. 2, 2001

(54) LASER PRINTER UTILIZING A SPATIAL LIGHT MODULATOR

(75) Inventors: Sujatha Ramanujan, Pittsford; Andrew F. Kurtz, Rochester, both of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/283,272

(22) Filed: Mar. 31, 1999

(51) Int. Cl.[7] .......................................................... B41J 2/45
(52) U.S. Cl. ............................................. 347/238; 347/239
(58) Field of Search .................................... 347/238, 241, 347/239, 244, 255, 258, 134, 137; 428/284; 359/623, 315, 321

(56) References Cited

U.S. PATENT DOCUMENTS

| | | |
|---|---|---|
| 4,207,370 * | 6/1980 | Liu ........................................ 428/204 |
| 4,281,904 | 8/1981 | Sprague et al. . |
| 4,376,568 | 3/1983 | Sprague . |
| 4,386,287 | 5/1983 | Karasawa et al. . |
| 4,413,270 | 11/1983 | Sprague . |
| 4,591,260 | 5/1986 | Yip . |
| 4,786,918 | 11/1988 | Thornton et al. . |
| 4,804,975 | 2/1989 | Yip . |
| 4,900,130 | 2/1990 | Haas . |
| 5,351,617 | 10/1994 | Williams et al. . |
| 5,517,359 | 5/1996 | Gelbart . |
| 5,521,748 | 5/1996 | Sarraf . |
| 5,619,245 | 4/1997 | Kessler et al. . |

OTHER PUBLICATIONS

Kurtz et al., "A Laser Printer Using a Fly's Eye Integrator", USSN 08/757,889, (Attorney Docket No. 74702), filed Nov. 27, 1996.

Kurtz et al., "A Laser Printer Using a Fly's Eye Integrator", USSN 08/757,889, (Attorney Docket No. 74702), filed Nov. 27, 1996, now PN 5,923,475 Jul. 13, 1999.

* cited by examiner

*Primary Examiner*—N. Le
*Assistant Examiner*—Lamson D. Nguyen
(74) *Attorney, Agent, or Firm*—David A. Novais; Nelson Adrian Blish

(57) ABSTRACT

A laser printer utilizes a total internal reflection spatial light modulator that is optimized to work with a partially coherent laser source. The laser source is a laser diode array having a plurality of multi-mode emitters. The spatial light modulator diffracts light from said laser source according to an applied electric field. A spatial filter having a slit passes designated diffracted light which corresponds to an applied electric field and the light is ultimately imaged onto an image plane by way of an imaging lens.

25 Claims, 15 Drawing Sheets

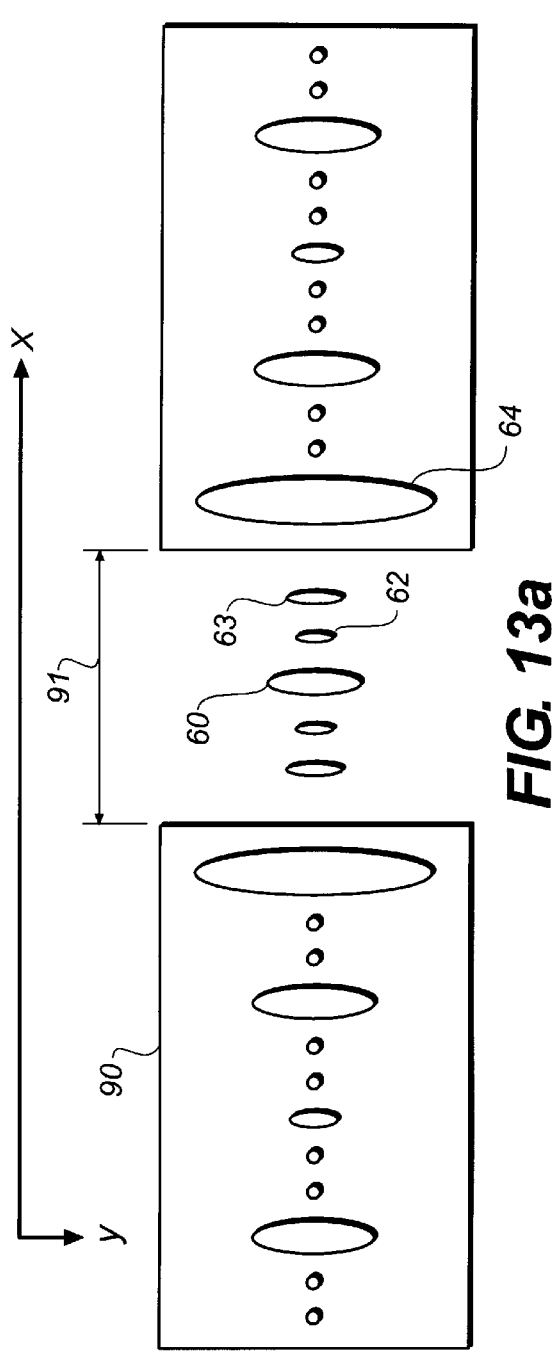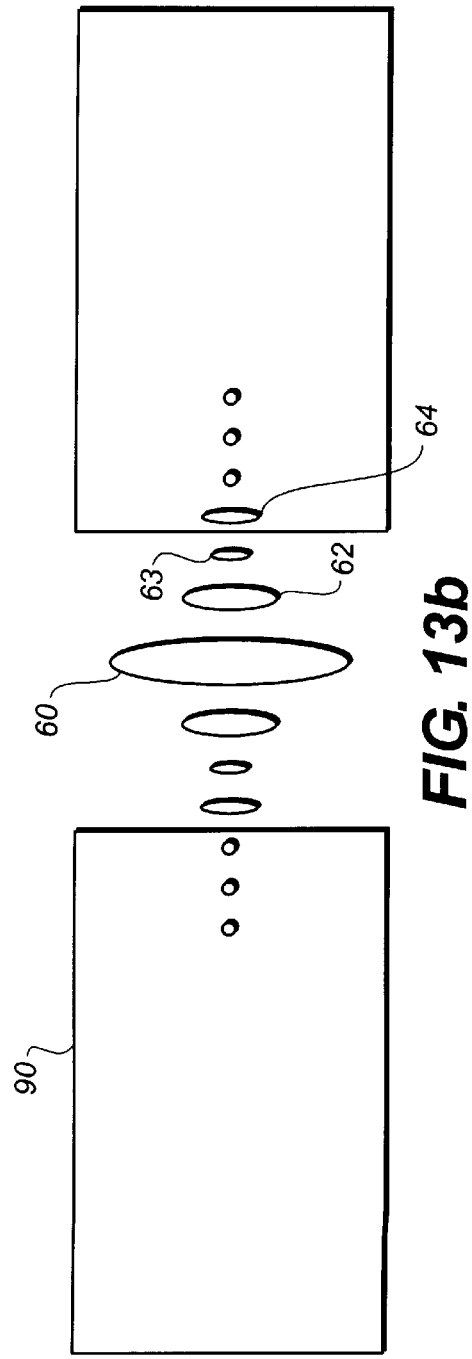

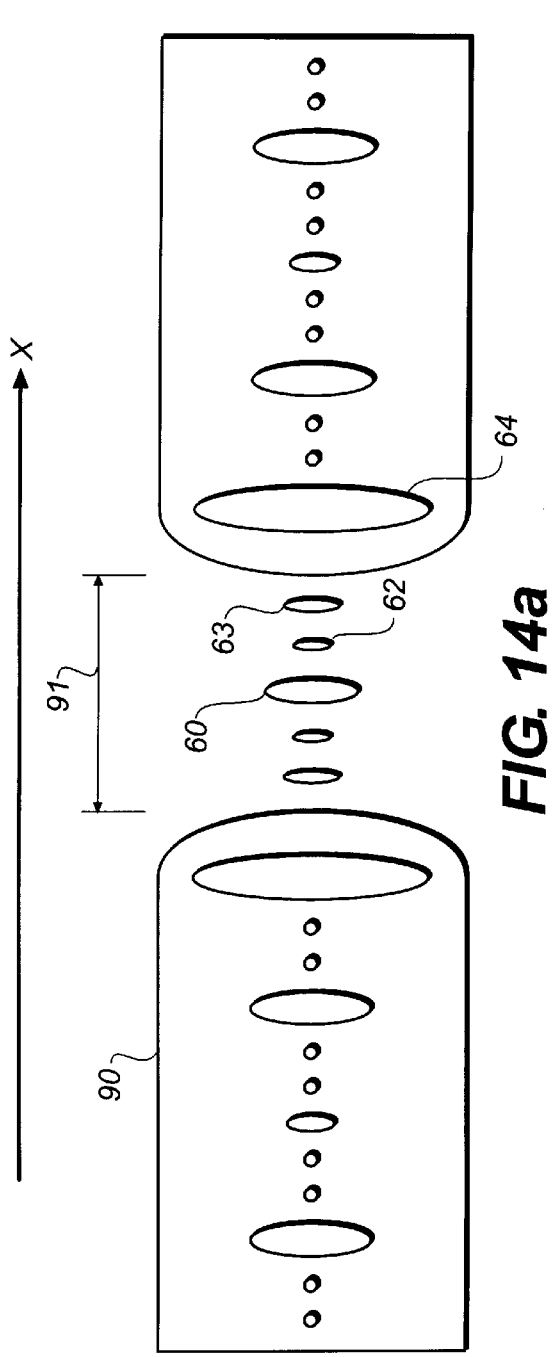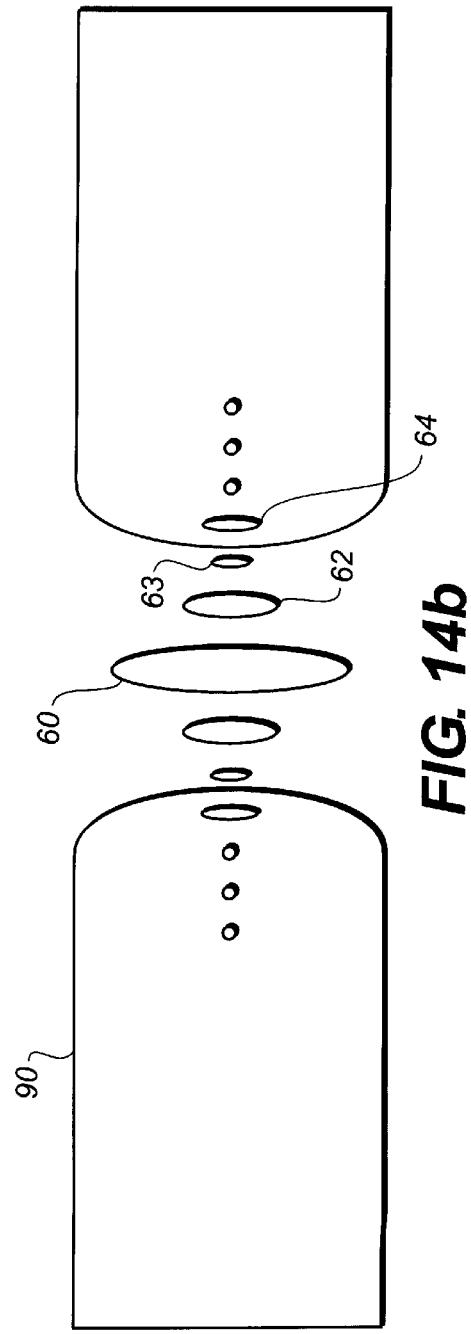
FIG. 14a
FIG. 14b

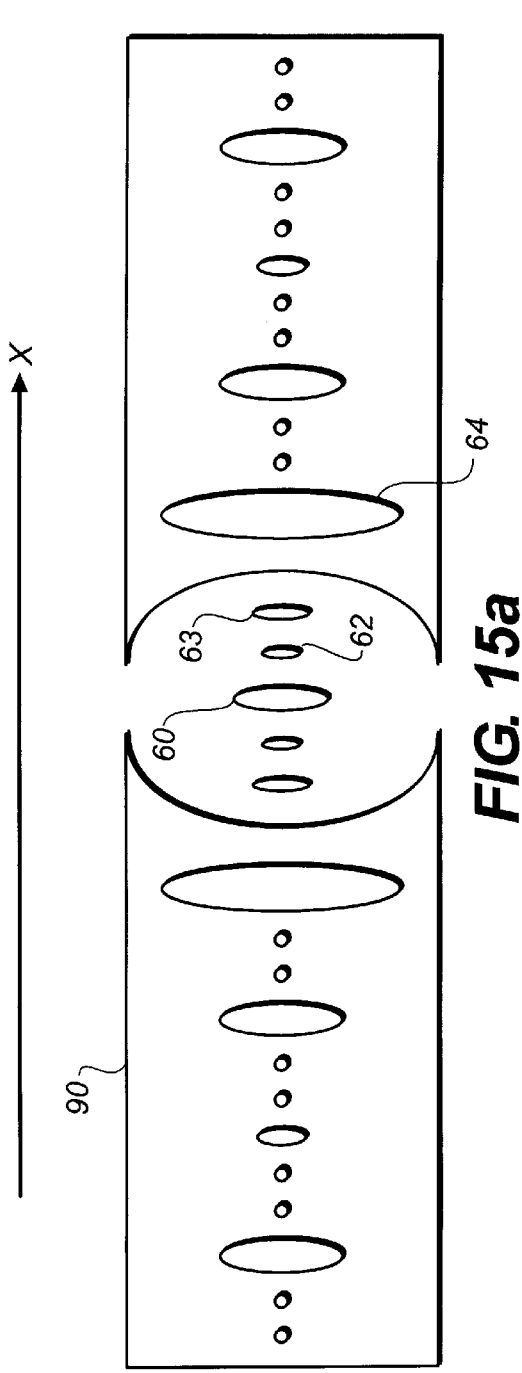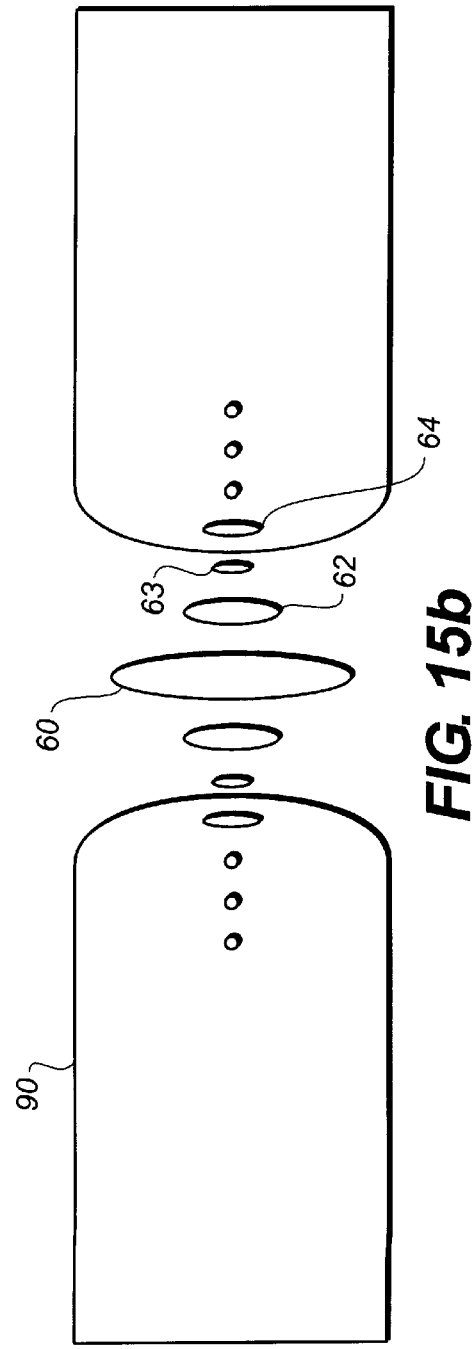

LASER PRINTER UTILIZING A SPATIAL LIGHT MODULATOR

CROSS REFERENCE TO RELATED APPLICATIONS

The present application is related to co-pending U.S. patent application Ser. No. 09/283,068, ENTITLED "MODULATOR FOR OPTICAL PRINTER", filed Mar. 31, 1999, concurrently filed herewith, by Alan C. G. Nutt; Sujatha Ramanujan; Joseph F. Revelli, entitled MODULATOR FOR OPTICAL PRINTING.

FIELD OF THE INVENTION

The present invention relates to laser printers utilizing total internal reflecting (TIR) electro-optic spatial light modulators, and in particular to a system with a multi-mode laser diode array source, illumination optics, imaging optics, and a TIR spatial light modulator optimized to work with a partially coherent laser source.

BACKGROUND OF THE INVENTION

Laser printers, particularly flying spot printers, are used in a wide variety of applications, from office printing, to medical printing, to bar code printing. These systems typically print with a single lower power beam, onto fairly sensitive media. Other systems, such as those used in the graphic arts industry, often are configured as multispot printers to attain sufficient productivity. As many of the graphic arts media are rather insensitive to light exposure, each of these incident beams must provide a high light level in a small spot at the printing plane. The printer is typically configured like a "lathe", where the page scan is obtained by rotating a drum which holds the media, and line scan, by translating the multiple laser beams in a direction parallel to the axis of rotation of the drum.

There are several approaches to solving the graphic arts printer design problem. In one approach, each of the laser sources is separately coupled to optical fibers, which are then mounted to form a linear array of sources. Each of these channels can then be independently modulated. Such systems are described in U.S. Pat. Nos. 4,900,130 and 5,351,617. Another approach is to utilize a monolithic array of laser sources and then image the elements of the laser array directly onto the light sensitive media to produce multiple spots. Power to each element of the laser array is individually modulated to obtain pixel densities. Such a system, described by U.S. Pat. No. 4,804,975 is potentially of lower cost and higher efficiency as compared to systems which couple the lasers to optical fibers. However, these systems are significantly disadvantaged as the failure of even one lasing element or emitter of the laser diode array source will appear as an artifact in the printed image, requiring replacement of the entire laser array source.

One approach to improving a printing system using a monolithic diode array source is to split each lasing element or emitter into an array of subarray sources, such as described in U.S. Pat. No. 5,619,245. Each writing element is assembled from the combined light of all the lasing elements or emitters of a given subarray, and each of the subarrays are directly and individually modulated to provide the image data output. This approach desensitizes the system to the failure of the lasing elements or emitters within a subarray.

Another approach to improving a system with a monolithic diode array source is to combine the light from each lasing element or emitter to flood illuminate a linear spatial light modulator array. The pixel elements of the modulator break up the light into image elements, and each pixel of the modulator is subsequently imaged onto the media plane to form the desired array of printing spots. Printing systems employing this approach are described in U.S. Pat. Nos. 4,786,918, 5,517,359 and 5,521,748. These systems improve upon the prior art designs by providing indirect light modulation means, so that the laser diode array operates at full power, and serves only as a light source. Also, as the light from the emitters overlaps in illuminating the modulator, the resulting redundancy desensitizes the system to the failure or poor behavior of any of the lasing elements or emitters within the array.

The performance of such systems, in which a linear spatial light modulator array is flood illuminated, is highly dependent on both the design of the illumination system and the design and operation of the modulator array. Optimally, the illumination system should provide highly uniform illumination with minimal loss of brightness. In U.S. Pat. No. 4,786,918, the Gaussian beams from many single mode lasers are combined in the far field to create a broad and generally slowly varying illumination profile, but one which still falls off in a generally Gaussian manner. The array of single mode lasers is carefully structured so that the beams from the individual laser sources are mutually incoherent, and therefore they can be superimposed without interference. Such a structure may provide the effect required of a relatively incoherent source that may be used in conjunction with a spatial light modulator. However, great care needs to be taken to guarantee that the source does not exhibit any phase locking, or coherence effects. Additionally, the modulator will require extremely uniform illumination in order to avoid streaking in the images. While this may be achievable within the constraints shown in U.S. Pat. No. 4,786,918, the care, detail and effort required may render the system expensive and difficult to maintain in a manufacturing environment.

U.S. Pat. No. 5,517,359 provides for a printing system with a laser diode array consisting of multimode emitters, each of which typically has a rather non-uniform near field profile. A mirror system, included in the illumination optics, partially improves the light uniformity by substantially removing the macro-nonuniformities in the light profile. Another method, as described in U.S. patent application Ser. No. 08/757,889, filed Nov. 27, 1996, and assigned to the same assignee as the present invention, also describes a printing system with a laser diode array including multimode emitters, but with an illumination system utilizing a fly's eye integrator. With the fly's eye integrator, both the micro and macro light non-uniformity can be substantially improved.

Given that the illumination optics efficiently provides a uniform illumination of the linear spatial light modulator, the overall system performance is highly dependent on the design and operation of the spatial light modulator array. Generally, candidate technologies for a spatial light modulator to be used in a laser printer for graphic arts should be highly transmissive with a high optical fill factor, have high thresholds for optical damage and altered behavior under exposure to high optical energy densities, and provide sufficiently high modulation contrast at high data rates. There are both electromechanical and electro-optical modulator technologies which meet these various criteria for use in a laser thermal printer.

Specifically, the TIR modulator, as described in U.S. Pat. Nos. 4,281,904 and 4,376,568, which is of the electro-optic variety, has many traits which lends itself to use in a laser thermal printer. These devices are transmissive modulators used with schlieren optics, produced from Lithium Niobate (LiNbO3) or Lithium Tantalate (LiTaO3), which can be designed for a high optical fill factor. Lithium Niobate is highly transmissive in the near infrared, and it has a high threshold to optical damage. Furthermore, the TIR modulator, as described by U.S. Pat. No. 4,376,568, is a device which modulates the light by imposing a grating structure on it when an electric field is applied. As a result the light is diffracted, and the modulated light is separated from the unmodulated light by spatial filtering at a fourier plane later in the optical system. As the TIR modulator uses schleiren phase modulation, as opposed to directly absorbing or blocking the light, the thermal load on the modulator is greatly reduced.

The TIR modulator as described in U.S. Pat. Nos. 4,281,904 and 4,376,568 performs admirably when illuminated by light from a highly coherent source. However, the high power laser sources needed for laser thermal printing applications are at best partially coherent.

SUMMARY OF THE INVENTION

An object of the present invention is to provide for a laser thermal printing system where both the optical system and the TIR modulator are designed to optimally work together when the light used therein is partially coherent.

The present invention relates to a printing system which comprises a laser diode array having a plurality of multi-mode emitters; a transmissive phase grating spatial light modulator which diffracts light from the laser diode array according to an applied electric field; array direction illumination optics for flood illuminating the spatial light modulator with light from the laser diode array; cross array illumination optics for limiting divergence of incident light from the laser diode array and focussing the light onto the spatial light modulator; an imaging lens having an internal fourier plane, with the imaging lens imaging light from the spatial light modulator onto an image plane; and a spatial filter having a slit. The spatial filter is located in close proximity to the fourier plane and passes designated diffracted light which corresponds to a given applied electric field.

The present invention also relates to a printing system which comprises a laser diode array having a plurality of multi-mode emitters; a spatial light modulator which diffracts light from the laser diode array according to an applied electric field; an optics assembly for providing light from the light source to the spatial light modulator; an imaging lens having an internal fourier plane, with the imaging lens imaging light from the spatial light modulator onto an image plane; and a spatial filter located in close proximity to the fourier plane and passing designated diffracted light which corresponds to a given applied electric field.

The present invention also relates to a printing method which comprises the steps of focussing light from a laser diode array having a plurality of multi-mode emitters onto a spatial light modulator; flood illuminating the spatial light modulator with the light from the laser diode array; diffracting the light through the spatial light modulator according to an applied electric field; passing designated diffracted light which corresponds to a given applied electric field through a spatial filter; and imaging the light onto an image plane.

BRIEF DESCRIPTION OF THE DRAWINGS

FIG. 13a is a frontal view of the spatial filter for the dark state of the incident light;

FIG. 13b is a frontal view of the spatial filter for the bright state of the incident light;

FIG. 14a is a frontal view of an alternate embodiment of the spatial filter for the dark state of the incident light;

FIG. 14b is a frontal view of an alternate embodiment of the spatial filter for the bright state of the incident light;

FIG. 15a is a frontal view of an alternate embodiment of the spatial filter for the dark state of the incident light; and FIG. 15b is a frontal view of an alternate embodiment of the spatial filter for the bright state of the incident light.

DETAILED DESCRIPTION OF THE INVENTION

Figure 1:
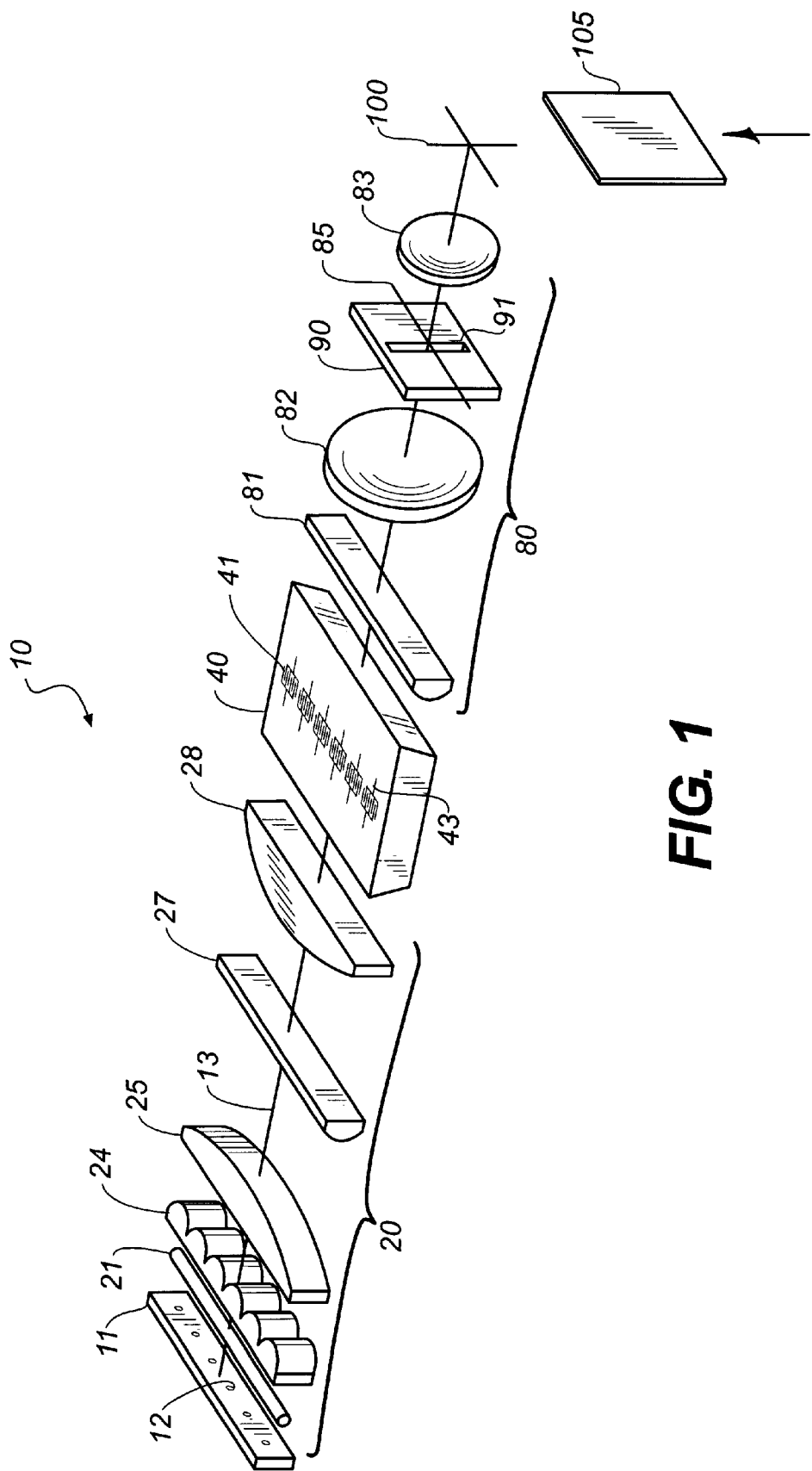
FIG. 1 is a perspective view of a laser printer according to the present invention.

Referring now to the drawings, wherein like reference numerals represent identical or corresponding parts throughout the several views, a preferred embodiment of the present invention is shown as a laser printer, referred to in general by numeral 10 in FIG. 1. Laser printer 10 comprises a laser diode array 11, illumination optics 20, a total internal reflecting (TIR) modulator array 40 having modulator pixels 41, a print lens 80, and a receiver or media 105, located at a media or image plane 100.

Laser diode array 11 is a high power array of laser sources, comprising a row of laser diode multi-mode emitters 12 oriented in a nominally linear fashion across an exit facet. Laser diode emitters 12 of laser diode array 11 are each activated simultaneously using a common power supply (not shown) in a CW (Continuous Wave) manner. The use of a CW laser without individual modulation simplifies the laser power supply and the heat dissipation system.

All laser diode emitters 12 of laser diode array 11, in combination with illumination optics 20, illuminate a line or area of specified size at TIR modulator array 40. In particular, the light from each laser diode emitter 12 is mapped by illumination optics 20 to cover the full width of TIR modulator array 40, thereby providing source redundancy, and reducing the sensitivity of the system to the malfunction of any one laser diode emitter 12.

Illumination optics 20 are shown as anamorphic, meaning there are separate optical systems, designed for the array and cross array directions, as the light output by laser diode emitters 12 has vastly different characteristics in the two directions. It should be understood that some axially symmetrical components, with power in both directions could also be used. The cross array elements of illumination optics 20 comprises fiber lens 21 and a cross array lens 27, which are designed to transfer the light from laser diode array 11 to TIR modulator array 40 in such a fashion that light incident within the region of modulation is confined within a vertical width of active modulator pixels 41. Typically, the cross array optics image laser diode emitters 12 to TIR modulator array 40. In order to control the image width and numerical aperture (NA) of the beam at TIR modulator array 40, the cross array optics can include means (not shown) for correcting cross array smile error of laser diode array 11. The effects of smile error can also be mitigated by imaging fiber lens 21, or its back focal plane, rather than laser diode emitters 12, to TIR modulator array 40. Fiber lens 21 can, for example, be a gradient index cylindrical microlens from Doric Lenses Inc. of Ancienne-Lorette, Quebec, or a hyperbolic cylindrical microlens from Blue Sky Research of San Jose Calif. It should be understood that the cross array optical system used to illuminate TIR modulator array 40 may include more lens elements than just the two elements shown if FIG. 1.

Illumination optics 20 also comprises the array direction optics, which are shown in FIG. 1 to include a laser lenslet array 24, a combiner field lens 25, and a field lens 28. When properly aligned, any given lenslet of laser lenslet array 24 will work in cooperation with combiner field lens 25 to image the laser diode emitter 12 which corresponds to that lenslet onto TIR modulator array 40. In like fashion, each laser diode emitter 12 is imaged onto TIR modulator array 40, with these multitude images being overlapped onto each other by combiner field lens 25. Laser lenslet array 24 and combiner field lens 25 can be manufactured as one integrated lens element, rather than as the two separate elements shown in FIG. 1. The array direction illumination optics can also include a variety of elements (not shown), including fly's eye integrators, integrating bars, or mirrors recombiners, so as to improve the uniformity of the array direction illumination to TIR modulator array 40.

Working together, the array and cross array optics flood illuminate the modulator with a long, narrow, line of light of sufficiently uniform radiance, while largely preserving the brightness of laser diode array 11 (less transmission and other losses) and providing redundancy relative to laser diode emitters 12. In particular, this anamorphic line of illumination extends the full length of TIR modulator array 40 in the array direction, while illuminating a narrow width in the cross array direction, roughly equivalent to the active width (electric field depth) of modulator pixels 41.

TIR modulator array 40 is then imaged to media plane 100 by print lens 80 to create a line of closely packed writing spots for marking media 105. Print lens 80 is typically a multi-element assembly, which may either be axially symmetric or anamorphic. For simplicity, print lens 80 of FIG. 1 is shown with three print lens elements 81, 82, and 83. Print lens element 82 acts as a field lens to condense light within the clear aperture of print lens element 83. Print lens element 82 also creates a fourier plane 85 at an aperture stop, where a spatial filter 90 is located. Spatial filter 90 may include a simple slit 91, as shown in FIG. 1, which passes the undiffracted light. In the circumstance where receiving media 105 is relatively light insensitive, such that the light level threshold required to achieve printing is very high, a central opening is preferred as optical transmission is maximized. Spatial filter 90 could also have a central obstructing bar, with openings to either side, so it passes the diffracted light. In this case, on-off contrast is enhanced vs. a loss in absolute light level available to print on media 105. Finally, spatial filter 90 may have a more complex structure of slits and obstructing bars. Spatial filter 90 can be planar as shown, or can be made along an arc or spherical shape, to match the non-paraxial shape of the aperture stop, thereby optimizing contrast. Print lens element 83 then completes the process of imaging TIR modulator array 40 to media plane 100. Print lens element 81 is an optional cylindrical lens element, which if used, alters the magnification of print lens 80, such that the array and cross array directions are no longer magnified identically. Print lens 80 is thus anamorphic, or assymetrical in function. This refinement may be employed if the aspect ratio of the light beam (width to height) at a pixel 41 is not identical to the desired aspect ratio of the imaged pixel at media plane 100. It should be understood that cylindrical print lens element 81 can in actuality be one or more lens elements. Likewise, print lens elements 82 and 83 are both also shown as one element each for simplicity, but each may comprise multiple lens elements.

The anamorphic nature of the optical design of laser printer 10 can be better appreciated by considering some specific numbers. A typical laser diode array 11 to be used in this application is an Optopower OPC-D020 laser, available from OptoPower Corporation, Tucson Ari. This laser is a 20 Watt laser which includes 19 multimode laser diode emitters, each 150 $\mu$m wide, and spaced apart on a 650 $\mu$m pitch. This laser emits linearly polarized light at 830 nm with an array NA of ~0.13 and a cross array NA of ~0.63. Thus, the Lagrange Invariant in the array direction (with the spaces between emitters removed) is ~0.187 mm, while in the cross array direction (with smile error minimized) it is only ~0.26 $\mu$m. Furthermore, unlike the array direction, where the emitters approximate miniature incoherent extended sources, in the cross array direction, the emitted beams are basically single spatial mode and Gaussian like in nature.

As the light emitted from these diode laser arrays typically has a bandwidth ($\Delta\lambda$) of ~3–4 nm, the coherence length $L=\lambda^2/\Delta\lambda$~0.2 mm. The coherence width (also known as coherence interval) in the array direction can be estimated as $D=(2*0.16*\lambda/NA)$=~2 $\mu$m, which is small compared to the 150 $\mu$m array direction width of any one laser diode emitter 12 of laser diode array 11. Thus, the light emitted in the array direction from a laser diode emitter 12, provided that the lasing structure is multimode, is minimally spatially coherent across laser diode emitter 12. As a result, the overall array direction profile of light from a laser diode emitter has minimal rippling from intra-emitter interference.

By maintaining the multimode, incoherent relationship between adjacent laser diode emitters 12, laser diode array 11 can provide illumination relatively free from filamentation effects typical of broad area or purely gain guided devices. The presence of individual laser diode emitters in the chosen laser diode array reduces the periodicity of any spatial substructure that may arise. Filamentation, which really only occurs within the substructure of an individual laser diode emitter, is minimal and need not in any way correlate to the adjacent laser diode emitter. Because laser diode array 11 is multi-element and less prone to filamentation effects at the required operation current, such a laser diode array can produce much higher output power levels while maintaining a spatially and temporally stable beam. Furthermore, the individual laser diode emitters 12 are sufficiently spaced as to be unlikely to display any phase coupling behavior. Consequently, interference effects that create and destroy modal structures and provide a nonuniform beam are avoided.

Another advantage of the relative incoherence of adjacent multi-mode laser diode emitters is the temporal stability of the laser diode array. Uncoupled, incoherent laser diode emitters generally do not exhibit the periodic, and quasi-periodic temporal behavior that has been observed in many other high power laser diode arrays.

Furthermore, the chosen laser diode array greatly simplifies the optical design of the rest of the printing system. By using a laser diode array with a series of colinearly positioned laser diode emitters 12, each providing light that is flat-topped and incoherent in the array direction, the optics to overlap and position light onto modulator array 40 are relatively simple. By comparison, the laser structure required by the arrangement of U.S. Pat. No. 4,786,918 is two dimensional, as the emitters are located in two parallel rows along the front face of the device. This structure effectively increases the cross array source lagrange, and therefore the NA at the modulator is increased as well. Alternately, this problem can be compensated using polarization and/or beam shifting optics, but the optical system would be more complicated and difficult to align than that of FIG. 1. Finally, for the system of the present invention, the interaction distance within spatial light modulator array 40 is determined by modulator array 40 and not by the width and coherence of the illumination. For this reason, the difficulty of modulator fabrication is reduced. Also, single pixel modulation depth at modulator array 40 need not be as rigidly controlled, and modulation uniformity can be achieved by groupings of pixels as opposed to on a single pixel basis.

Referring back to the cross-array direction, the cross-array direction coherence width is larger than the cross array direction $1/e^2$ emitting width of a laser diode emitter 12, which can be estimated as $H=2*\lambda/(\pi*NA)=0.85$ $\mu$m. Thus, light from any laser diode emitter 12 of laser diode array 11 is spatially coherent in the cross array direction. Again, the multitude of laser diode emitters 12 across laser diode array 11 are not phase coupled with one another. Therefore, the light from the multitude of laser diode emitters 12 can be combined at TIR modulator array 40 without interference and resulting rippling in the irradiance profile. It is the minimal coherence in the array direction coupled with the coherence of the cross-array direction that allows the use of TIR spatial light modulator 40 in this application. Without the uniqueness of the optical design used in conjunction with a very specific TIR spatial light modulator design, the required light transmission at intensities of tens of Watts with sufficient contrast would be unattainable.

While array direction light from any one emitter is incoherent enough that filamentation is not significantly in evidence, and is incoherent enough that light from any one emitter can be overlapped with itself (such as by a fly's eye integrator) without significant interference effects, the light is coherent enough to be effected in a useful fashion by TIR modulator 40. In particular, when the 2 $\mu$m coherence width is magnified to the modulator plane, the coherent region covers ~410 $\mu$m or 3.4 pixels. Thus, the light is coherent enough across any one pixel to be phase modulated by that pixel.

Figure 2:
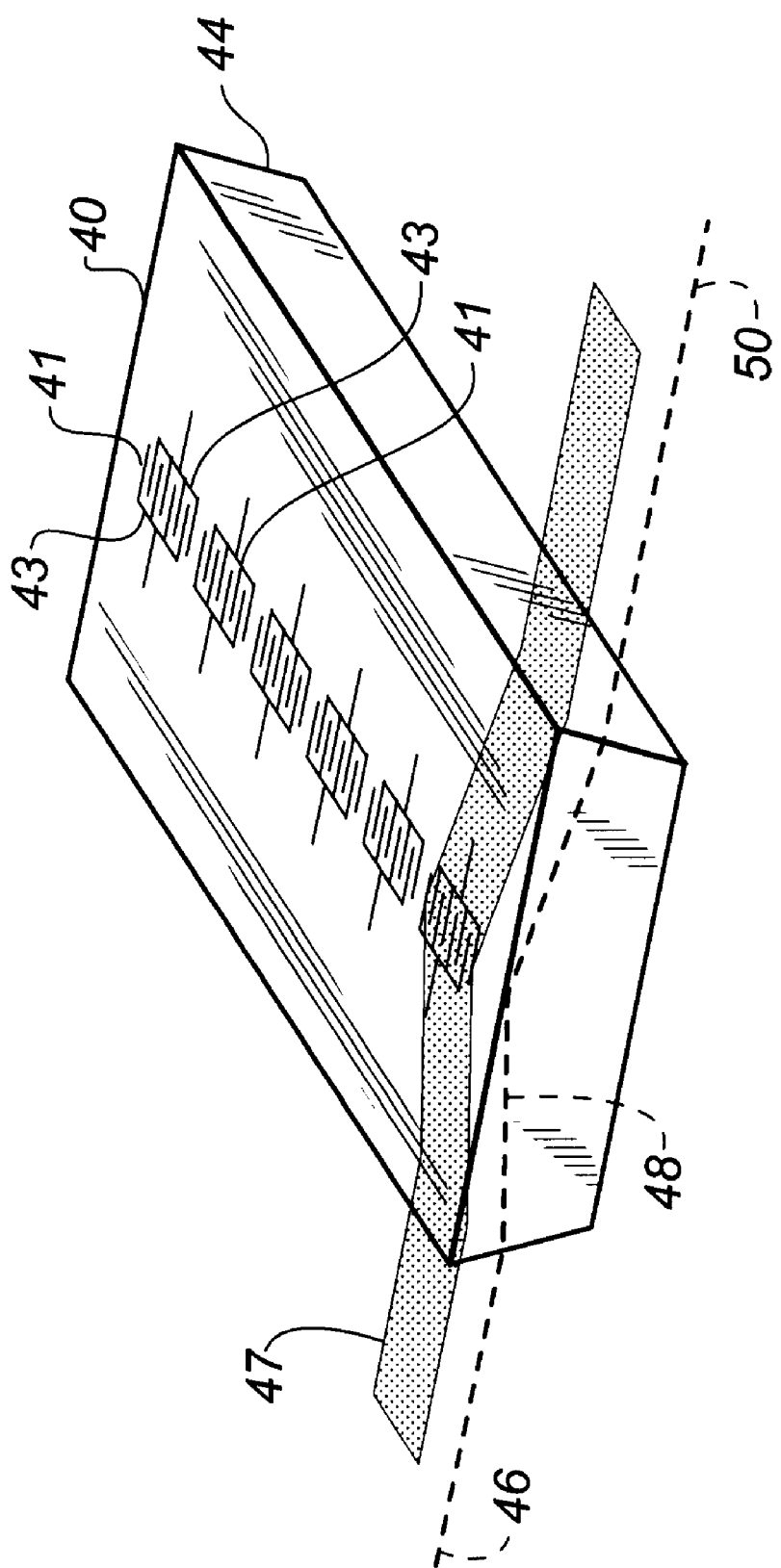
FIG. 2 is a perspective view of a TIR spatial light modulator as used in the present invention.

In a preferred configuration for TIR modulator array 40 shown in FIG. 2 and discussed in copending application Ser. No. (Docket 79090), there are 256 pixels arranged linearly, with each pixel having a defined width of 120 $\mu$m, and TIR modulator array 40 therefore has a total active length in the array direction of 30.72 mm. Thus when light from laser diode array 11 is imaged onto TIR modulator array 40 to flood illuminate the total active length, the resulting illuminating array direction NA at TIR modulator array 40 is ~0.0122. Each pixel 41 contains a plurality of electrodes 43 that establish an electric field between adjacent electrodes 43. The electric field within each pixel 41 acts as an independent finite phase grating. An incident beam 46, which is refracted to form a refracted beam 48 in an electro-optic substrate 44 undergoes a phase change within the interaction length of an activated pixel 41. The resulting beam 50 is modulated within the width of an addressed pixel 41. Reference numeral 47 in FIG. 2 schematically illustrates how beams 46, 48, 50 cover the width of a pixel 41. Because beam (46, 48 and 50) is minimally coherent in the array direction, the local modulation of the beam does not strongly interfere in the fourier plane 85 with the other overlapped pixel fourier planes. In effect, any filtering in the fourier plane applies to each independent pixel. This is a key element in the design of this TIR modulator based printing system. Furthermore, because the initial laser diode emitters in the laser diode array are colinear along the array direction, the constraints of interaction distance and optical cross talk can be reduced. Without the particular method of utilizing substantial incoherence in the array direction presented in this discussion, the effective interaction distance would be reduced, and the modulation depth would be severely compromised. In FIGS. 1 and 2, each pixel 41 is shown spaced from each other in an exaggerated manner to more clearly describe the invention. It is recognized that the pixels 41 are closely spaced and are nominally separated from one another by the intra-pixel electro-pitch (~20 $\mu$m).

Figure 3:
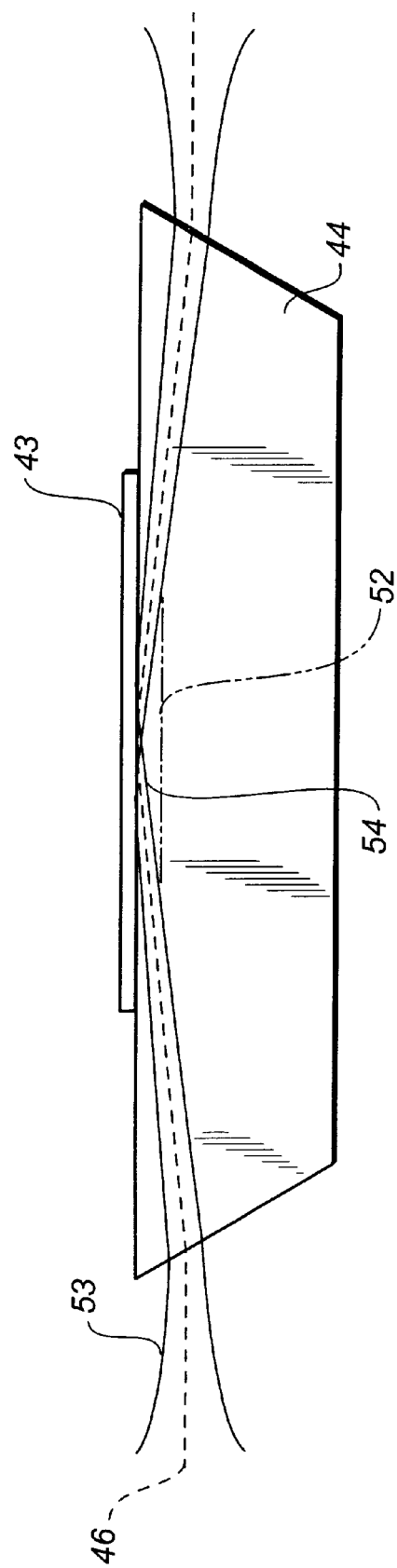
FIG. 3 is a side view of the TIR spatial light modulator, showing the relationship of incident light relative to the modulation region.

TIR modulator array 40 is shown in cross-section along the propagation direction in FIG. 3, which depicts the propagation of light along the optical path and through TIR modulator array 40. Incident Gaussian beam 53 reaches a Gaussian beam waist 54 either at or in close proximity to the point of total internal reflection under electrodes 43. In the cross array direction, the pixel height, which is contained within the $1/e^2$ value of the electric field 52, is ~20 $\mu$m. This penetration depth may be loosely approximated by the pitch of the electrodes. A more rigorous analysis of the static electric field profile through finite element analysis shows the penetration depth to be approximately 25 $\mu$m for an applied electric field of 85V. The cross array optical system is designed to slightly underfill this electric field depth as provided by TIR modulator array 40 at each pixel 41. Typically then, the cross array illumination optics will create a beam waist 54 at TIR modulator array 40 of ~20 $\mu$m full width ($1/e^2$) with an NA of ~0.03 (or larger, depending on residual smile). By providing a beam waist sufficiently contained within the electric field, even modulation across the cross scan direction of the optical field is obtained. If beam waist 54 is too wide, none uniform modulation across the beam will serve to reduce contrast, reduce transmission, or require a complex spatial filter design. A beam that is significantly wider in the cross array direction may acquire sufficient modulation across the width of the beam if the interaction length is sufficiently long. However, any nonuniformities in the crystal or in the electric field can cause non-uniform modulation in the cross scan direction. In order to reduce the constraints on the modulator fabrication and operation, it would be preferable to constrain the cross-sectional beam waist. However, if beam waist 54 in the cross array direction is overly constrained, the Rayleigh distance is also reduced. The beam then exits the electric field penetration depth quickly, thus curtailing the interaction distance. It is for this reason among others that the optical design must be carefully balanced with the design of the optical modulator to provide adequate contrast, and transmission for a given wavelength and coherence.

The next constraint on the optimal design is the effective interaction distance. The effective interaction distance is determined by the distance optical beam 48 must travel such that a significant portion of the beam, for instance ½ of the cross array width lies inside of the 1/e2 penetration depth of the electric field. This distance is determined by the angle of incidence of optical beam 48 on the surface of the crystal 44, the cross array width and the cross array NA. For an internal incidence angle of approximately 2 degrees, the effective interaction distance is typically less than or equal to 1.5 mm.

Figure 4:
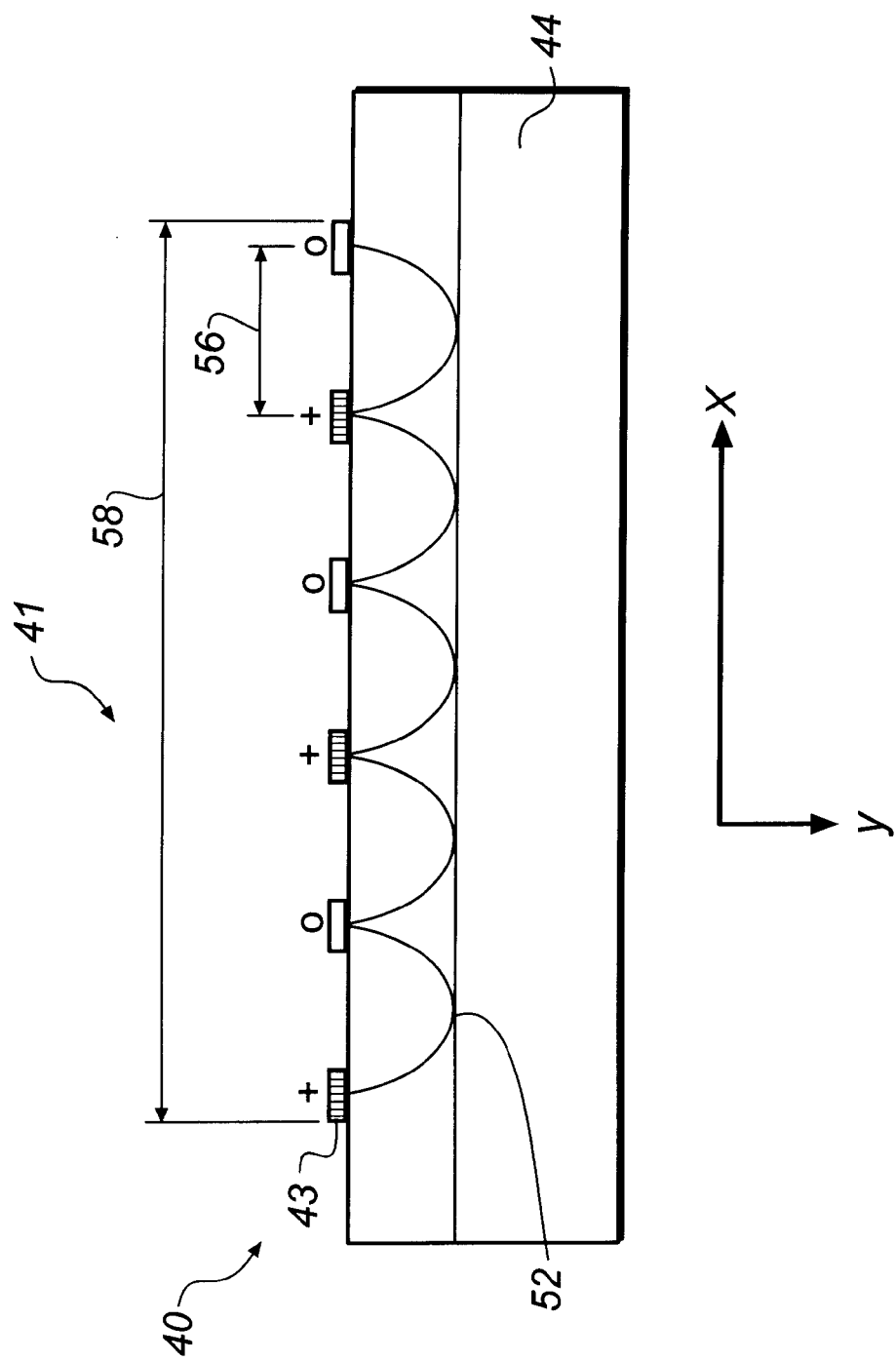
FIG. 4 is a cross-sectional side view showing the pattern of the electric fields generated by the electrode structure when a pixel of the TIR spatial light modulator is being modulated.

FIG. 4 shows a cross sectional width 58 of a single pixel 41 in modulator 40. The pixel width of 120 $\mu$m is chosen to allow at least 3 full cycles, or three grating periods of the phase grating at a 20 $\mu$m intra-pixel electrode pitch 56. Adjacent electrodes 43 when activated maintain opposite polarity, thus establishing an electric field between them. The strength of the electric field at the 1/e2 depth 52 as shown in FIGS. 3 and 4 is determined by the applied voltage. When each pixel 41 is approximated as an independent phase grating of finite extent, and when sufficient diffraction efficiency is allowed for, at least 3 full cycles of phase change are required. The greater the number of periods in each individual pixel, the greater the diffraction efficiency and hence optical efficiency of the modulator. However, creating too many periods results in large pixels. The larger pixels would place a further burden on the illumination optics uniformity and extent. Also, larger pixels would require a larger crystal 44 for modulator 40 which would increase the cost of the system. This is one of the reasons 120 $\mu$m pixels with 20 $\mu$m intra-pixel electrode pitch 56 such as depicted in copending application Ser. No. (Docket 79090) is suitable for this application. The intra-pixel electrode pitch 56 of 20 $\mu$m is chosen in part for the penetration depth of the electric field. A wider intra-pixel electrode pitch such as 30 $\mu$m would have a greater penetration depth which would allow for a wider cross array beam waist. However, the halfwave voltage required would be greater. A narrower intra-pixel electrode pitch such as 10 $\mu$m would have insufficient penetration into the modulator for the chosen cross array beam waist and NA.

Figure 5:
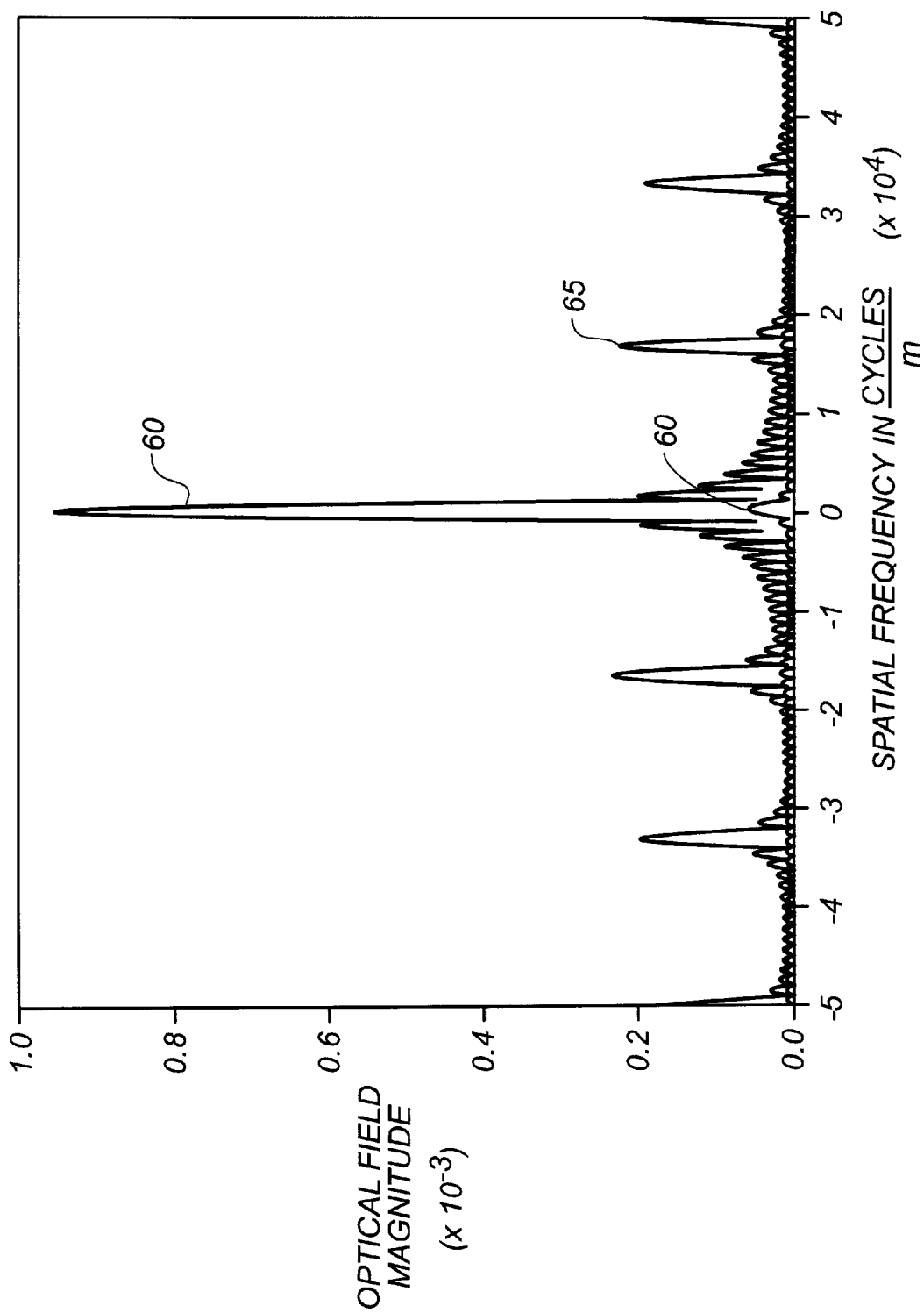
FIG. 5 shows diffracted light in a fourier plane for On and Off states of a group of pixels with negligible NA (numerical aperture) in the illumination.
Figure 6:
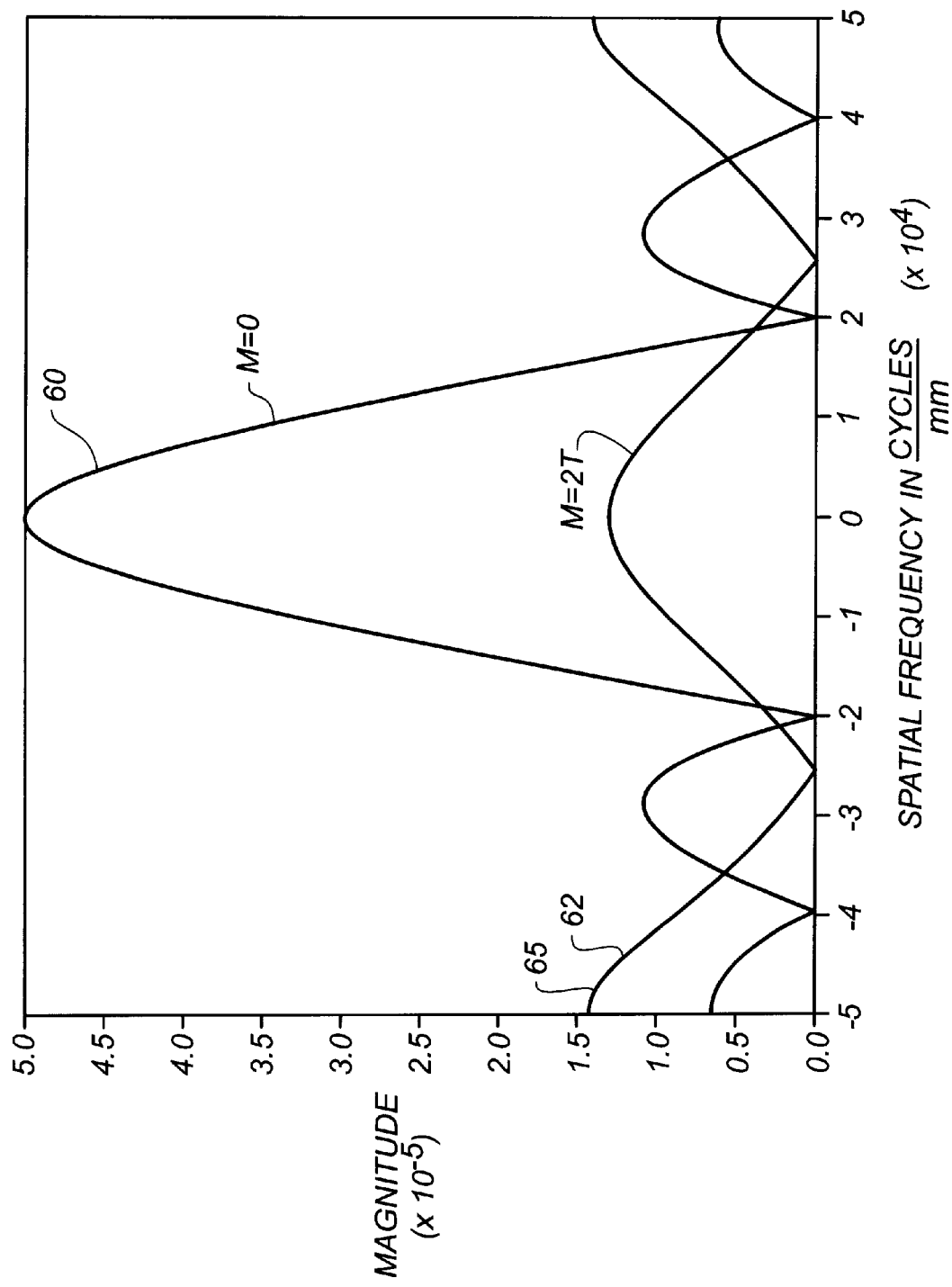
FIG. 6 shows diffracted light in a fourier plane for On and Off states of a pixel with noticeable NA.

The next constraint on the printing system is the relationship between the array direction NA and the pixel structure. The phase grating nature of each pixel is exploited by spatially filtering selected orders in the fourier plane. If the system had a negligible NA there would always exist marked separation between adjacent grating orders. FIG. 5 shows the on and off states in the fourier plane of 16 adjacent pixels in a system with negligible NA. The vertical axis is the light magnitude in arbitrary units, and the horizontal axis is spatial frequency. As can be seen in FIG. 5, there is a marked separation between the zero order 60 in the unactivated state and the first substantial order 65 which may be an order higher than the actual first order. With a wider NA this separation quickly disappears. FIG. 6 shows an activated and deactivated state of a single pixel with finite NA. The zero order 60 and the first order 62 of the activated state are beginning to merge. However, as with all practical systems, the NA is finite. The grating must then be designed to allow sufficient separation between orders where the width of each order in the fourier plane is defined by the NA. A simple approximation of the required separation is that the intra-electrode pitch be less than the wavelength divided by the numerical aperture. A finite element model of the propagation of the light within lithium niobate helped determine that electrode pitches between 15 and 20 $\mu$m provide sufficient separation between orders with the NA at 0.012 in the array direction. A smaller electrode pitch while providing better separation of orders does not allow sufficient electric field penetration and too tightly confines the beam waist in the cross-array direction. The other constraint on the array direction NA is the requirement of minimal cross talk between adjacent pixels. Light from neighboring pixels should not substantially leak into neighboring pixels within the interaction length of the pixel. Setting the goal that light from the center of the pixel should not reach the neighboring pixel within one interaction length determines the constraint that theta ($\theta$), the NA for small angles, is less than or equal to the width of the pixel divided by 2 times the interaction length.

Having determined the illumination and the modulator constraints, the next design issue is the operating voltage. Remembering the modulator design constraint that the operating voltage remain less than 100 V, modeling each pixel as a finite phase grating leads to several at times counter intuitive results. At first glance, it may appear that the best operation, or greatest modulation and corresponding contrast are best achieved when the phase change acquired is $\pi$. However, for this printer design, the required phase change need not be $\pi$. Additional design parameters which help to determine the best operating voltage and phase change include the NA in the cross array direction, the reconstruction shape of the filtered field, and the order into which a substantial portion of the light is diffracted. The cross array NA along with the beam width determine the extent of the interaction region. The interaction region times the voltage are directly proportional to the total phase change obtained. Maximum phase change is $\pi$ radians. However, this phase change may not diffract the light into the easiest to filter profile. First, approximating each pixel as a sinusoidal phase grating, for an even number of pixels N, allows representation of a collection of pixels as:

$$f(x) = \text{rect}((x-((N/2p+(N+1)s/2-s))/2)/(w-(N/2p+(N/2-1)s+s/2))) + \Sigma^{N/2}_{\iota=1}\text{rect}((x-I\,(s+p))/s)$$

$$+\text{rect}((x-((N/2p+(N+1)s/2-s))/2)/(w-(N/2p+(N/2+s/2)-s))) +$$

$$\Sigma^{N/2}_{\iota=1}\text{rect}((x+I(s+p))/s)+\text{rect}(x/s) +$$

$$\Sigma^{N/2}_{\iota=1}\text{rect}((x-((s+p)/2+(I-1)(s+p)))/p) +$$

$$\Sigma^{N/2}_{\iota=1}\text{rect}((x+((s+p)/2+(I-1)(s+p)))/p)$$

where x is the position along the array, p is the pixel width, s is the edge to edge element spacing, N is the number of pixels, and 2w is the window of simulation. This particular expression is valid for more than 4 pixels that are spaced adjacently. The fourier transform of the previous expression represents the spatial frequency profile of the beam in the fourier plane. Calculation of the expressions for the fourier transforms of the previous equations is straightforward. Within the expressions the term defining the operation of the individual pixel gratings is the summation of bessel functions Jq(m/2), where m is approximated by $$m = (2\pi/\lambda) L n_0^3 r_{33} V/d,$$

and $\lambda$ is the operating wavelength, L is the interaction distance, $n_0^3$ is the index of refraction, $r_{33}$ is the electro-optic coefficient, d is the field depth and V is the applied voltage. We choose the parameters in m to maximize diffraction efficiency within what is spatially filterable for the given NA. This may imply that the best diffraction is not into the first order, but to the third or higher order. Therefore, a voltage which enables a specific m value can be preferable, as the diffracted light will then be easier to spatially filter. From the value of m, an optimal slit width may be calculated in spatial frequency space, where m is related to the specific orders in which diffracted light resides. It may then be favorable to select operational parameters such that the bulk of the diffracted light lies outside the second order of the diffraction profile. In some cases, it may be possible and preferential to diffract the light into the m=8 orders.

Spatial filter 90 incorporated into print lens 80 at fourier plane 85 is constructed to match the constraints of the optical system and spatial light modulator 40. Spatial filter 90 is designed to allow an optimal transmission of 81%, ideally greater than 90% is desired, and as low as 65% may be deemed acceptable. Furthermore, a contrast ratio of 10 to 1 is needed. With these constraints, an electrode pitch of 20 $\mu$m, a pixel pitch of 120 $\mu$m, and a desired halfwave voltage of less than 100V, the spatial filter chosen is a 4.6 mm slit. (spatial filter widths of 3.8 mm and 5.2 mm also met the constraints but 4.6 mm was deemed optimal). A slit in fourier plane 85 establishes bright field operation. Bright field implies, when no voltage is applied to a pixel, light is not diffracted. Most of the incident light passes through spatial filter 90 and is reconstructed in the image plane. When a voltage is applied, light is diffracted. Sufficient amount of the light does not pass through spatial filter 90, and the reconstruction is dark.

Figure 7:
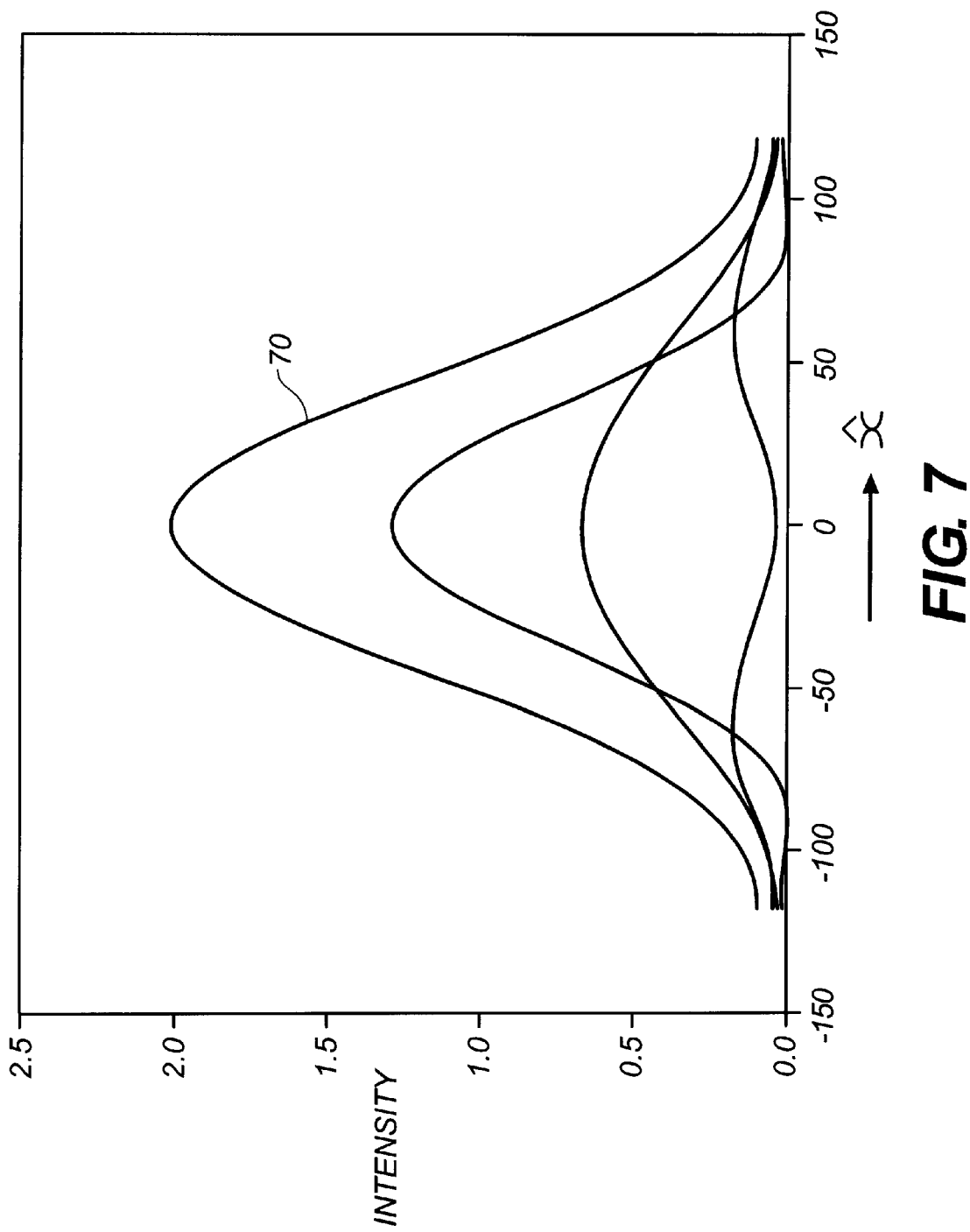
FIG. 7 shows a reconstructed bright image of a pixel with a spatial filter width corresponding to +/−0.01 cycles/$\mu$m.
Figure 10:
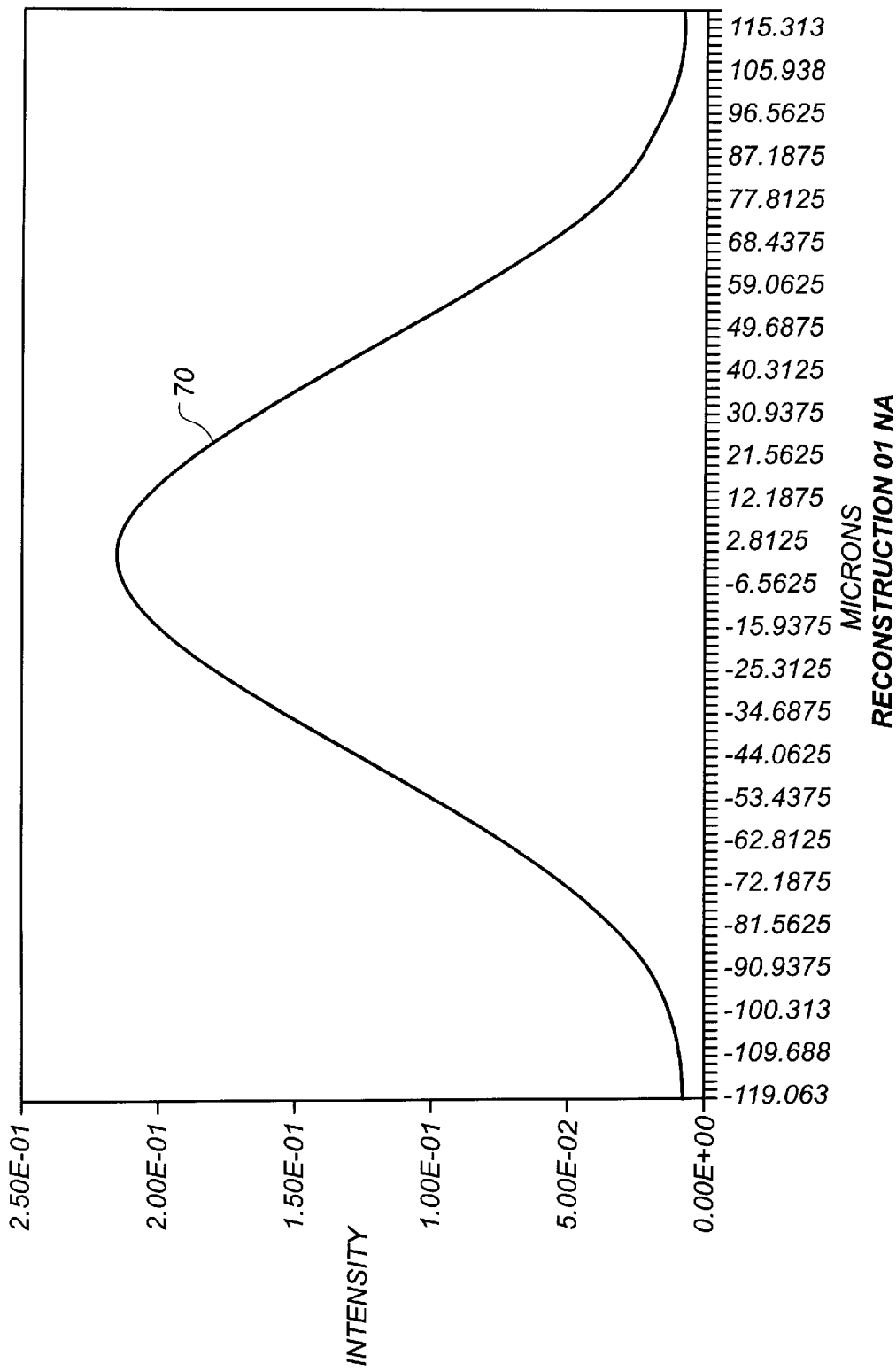
FIG. 10 shows a reconstructed bright image of a pixel with a spatial filter width corresponding to +/−0.01 cycles/$\mu$m.

The construction of slit 91 must meet the desired system constraints but must also reconstruct a pixel that is close to square and does not leave gaps between adjacent pixels. Too small a slit width will provide good contrast, but without some of the side orders about the zero order of the since function that defines the fourier transform of a square pixel, the reconstructed shape of the pixel in the bright state will be too rounded. Such an example is shown in the FIG. 7 reconstruction of a bright pixel 70 with array direction illumination NA of 0.012 and a 0.01 cycles/$\mu$m slit in the fourier plane. As can be seen in FIG. 7, the reconstructed pixel appears rounded and will result in inter-pixel gaps at the image plane. The reconstruction of the bright state of the pixel depicted in FIG. 7 is shown in FIG. 10. The residual light, or leakage light, is insignificant and the contrast is excellent.

Figure 8:
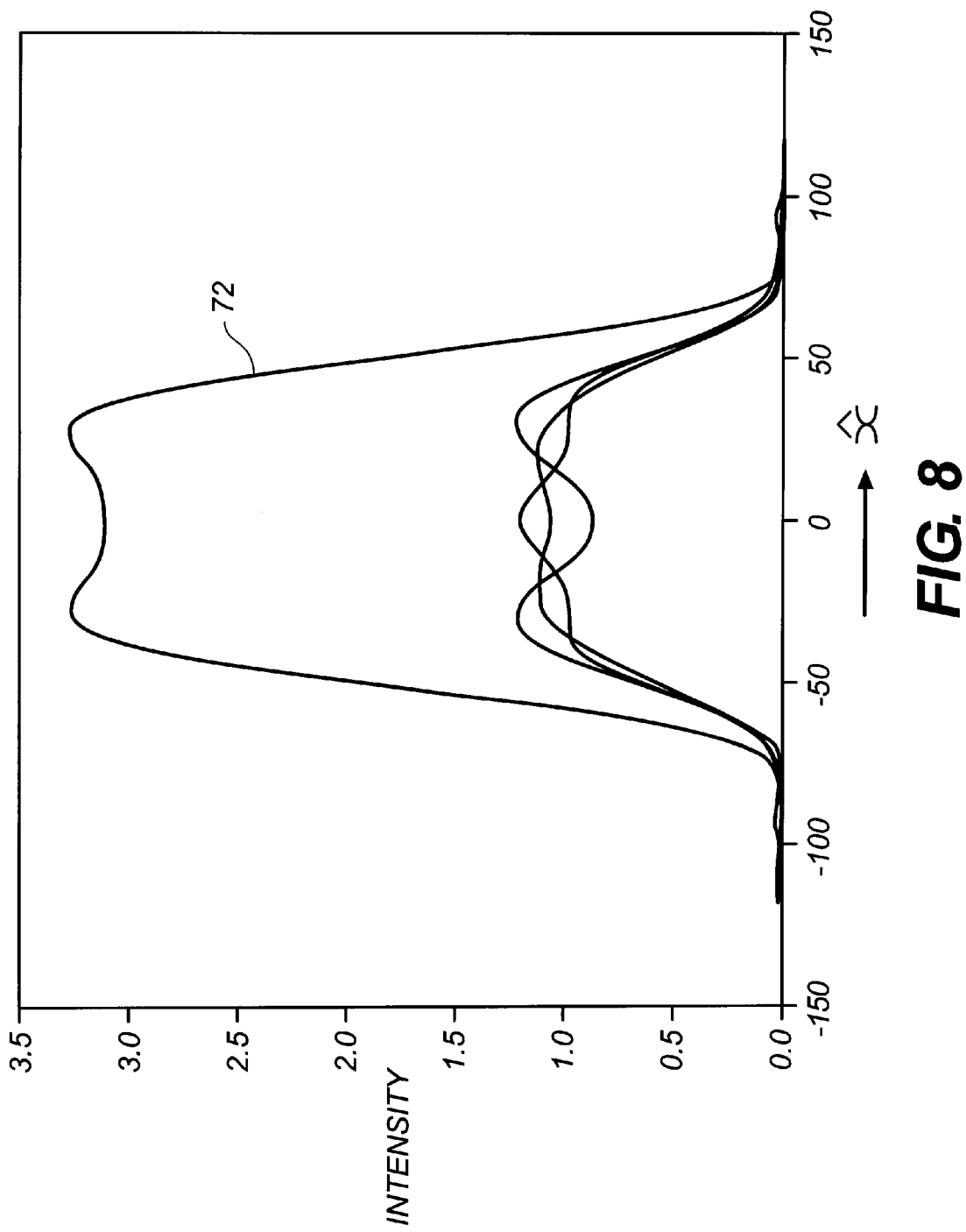
FIG. 8 shows a reconstructed bright image of a pixel with a spatial filter width corresponding to +/−0.03 cycles/$\mu$m.
Figure 11:
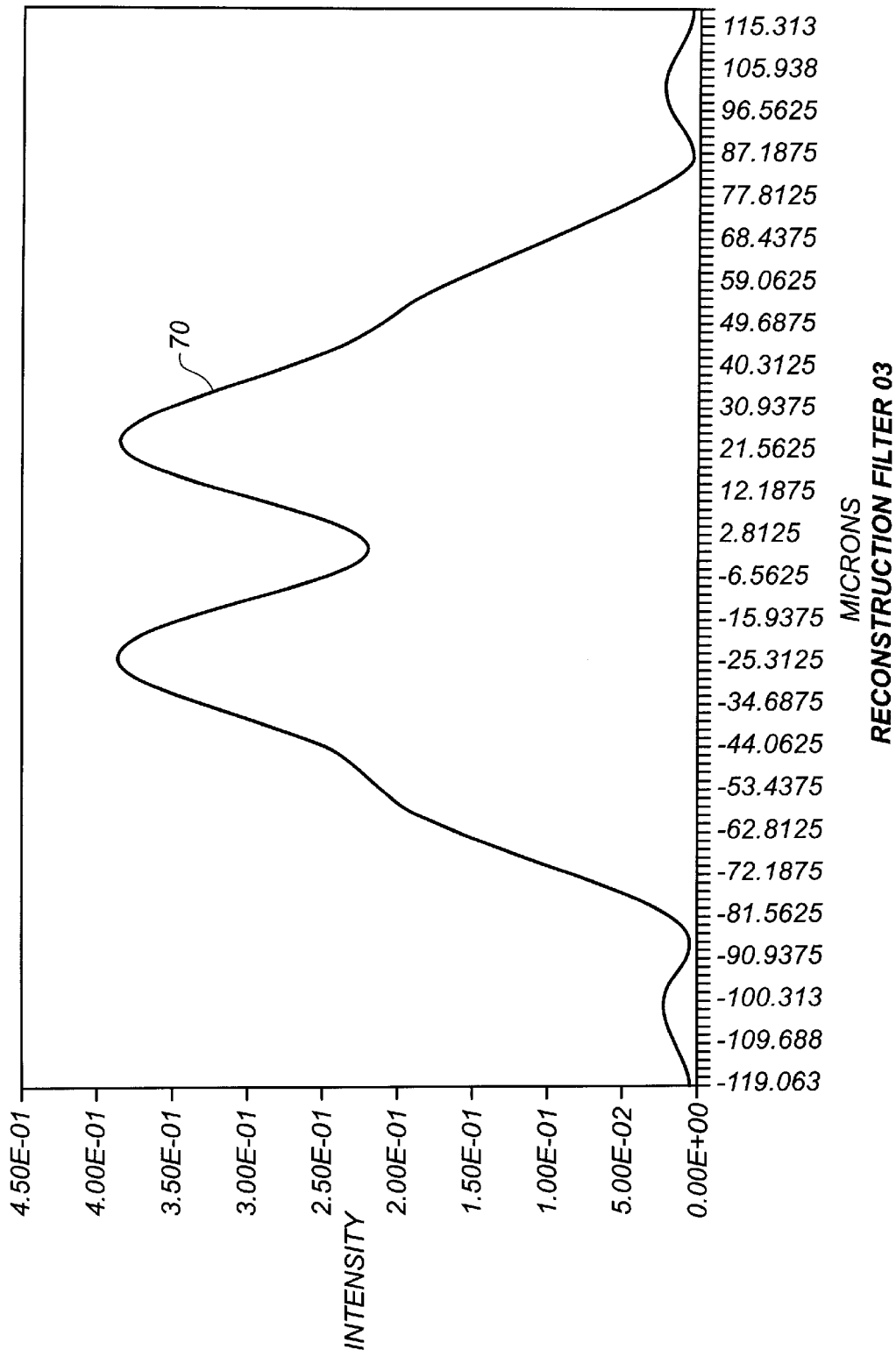
FIG. 11 shows a reconstructed bright image of a pixel with a spatial filter width corresponding to +/−0.03 cycles/$\mu$m.
Figure 12:
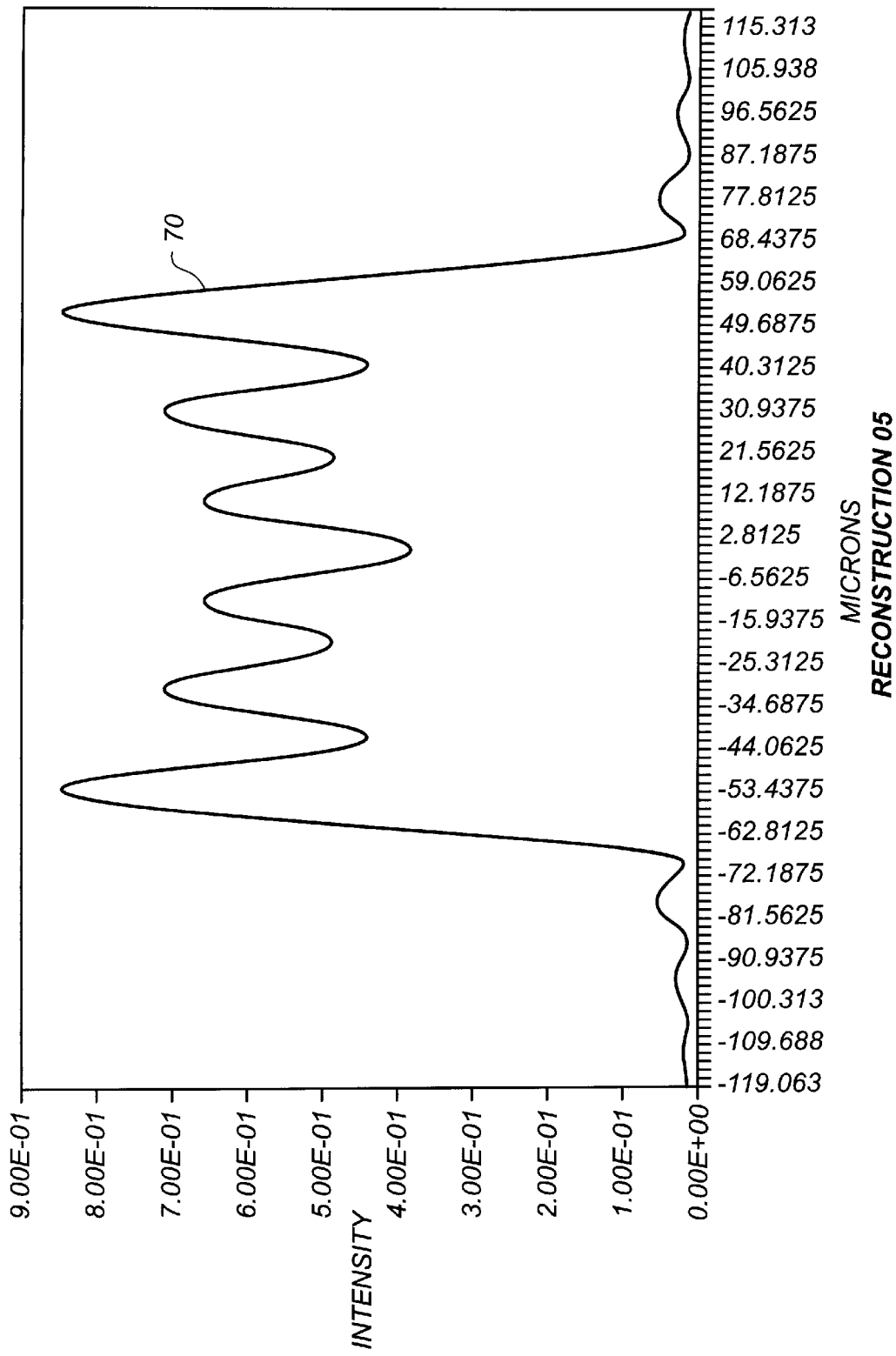
FIG. 12 shows a reconstructed bright image of a pixel with a spatial filter width corresponding to +/−0.05 cycles/$\mu$m.

Widening slit 91 to +/−0.03 cycles/$\mu$m results in a closer to square reconstruction as is seen in FIG. 8, while maintaining both a sufficiently low residual light level in the dark state as is seen in FIG. 11, and therefore good contrast.

Figure 9:
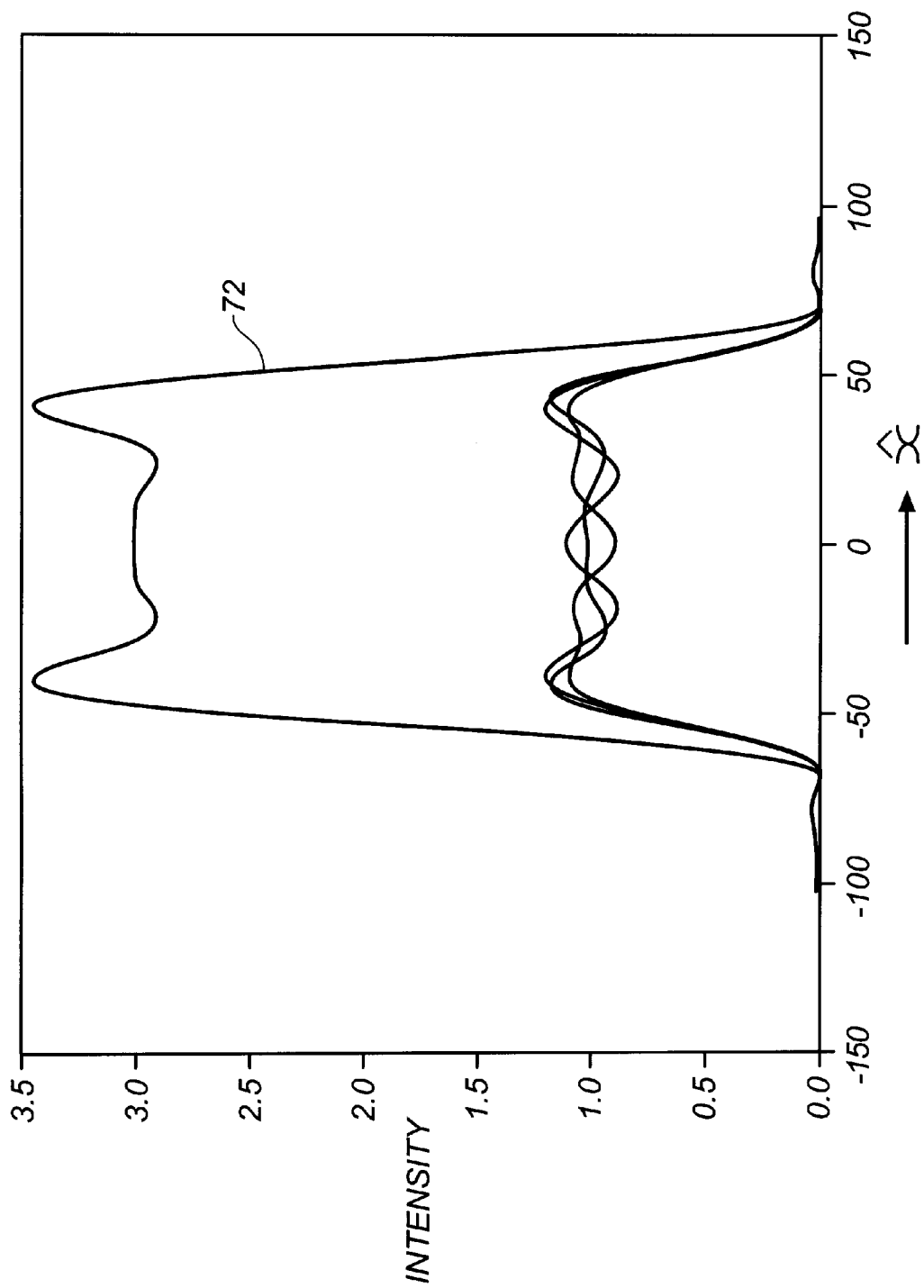
FIG. 9 shows a reconstructed bright image of a pixel with a spatial filter width corresponding to +/−0.05 cycles/$\mu$m.

The effect of employing too wide a slit width is seen in FIG. 9 where the bright state of a pixel reconstructed with a +/−0.05 cycles/$\mu$m slit is shown. The reconstructed bright pixel is somewhat square, but the reconstructed dark state shown in Fig, 12 has excess residual light. This residual light could expose media and thus reduce contrast.

From the appropriate slit width in the fourier plane determined in cycles/$\mu$m, the slit width can be determined from the wavelength of illumination and the focal length of projection lens element 82. For a NA of 0.012, a wavelength of illumination between 810 nm and 860 nm, and a front end focal length of 241 mm, a good slit width ranges from 3.2 mm to 5.9 mm. Efforts to maximize contrast may also result in a chosen and adequate slit width of +/−0.015 cycles/$\mu$m in an implemented system.

The simple chosen slit 91 for filter 90 is shown in FIG. 13a for the dark state and FIG. 13b for the bright state; it is a basic rectangle. The central order (zero order) (central lobe) 60 and the first 62 and second diffracted 63 orders pass through the slit 91 in FIG. 13a. The third order 64 where substantial diffracted light resides is blocked by filter 90 as is seen in FIG. 13a. In the bright or non-activated state, the bulk of the power resides in central lobe 60 which passes through filter 90 as is seen in FIG. 13b. Because the illumination is anamorphic and the electric field depth is shallower than the pixel width, the shape of slit 91 may be modified to reflect the shape of the beam. Depending on the specific NA, the shape may be either hour glass to account for a wide NA in the array direction as is shown in FIGS. 14a and 14b (the dark and bright states), or tapered to allow for shallow field depth in the cross array direction as is shown in FIGS. 15a and 15b (the dark and bright states).

The net transmission of the system is largely filter dependent. With the mentioned parameters, 65% system transmission, 10:1 contrast, and less than 15% optical cross talk is achievable. The use of a largely incoherent optical system in conjunction with a spatial light modulator designed to specifically handle the large power densities and the spatial incoherence provide a unique and efficient means by which to print.

The invention has been described in detail with particular reference to certain preferred embodiments thereof, but it will be understood that variations and modifications can be effected within the spirit and scope of the invention.

What is claimed is:

1. A printing system comprising:
  a laser diode array having a plurality of multimode emitters;
  a transmissive phase grating spatial light modulator which diffracts light from said laser diode array according to an applied electric field;
  array direction illumination optics for flood illuminating said spatial light modulator with light from said laser diode array;
  cross array illumination optics for limiting divergence of incident light from said laser diode array and focussing said light onto said spatial light modulator;
  an imaging lens having an internal fourier plane, said imaging lens imaging light from said spatial light modulator onto an image plane; and
  a spatial filter having a slit, said spatial filter being located in close proximity to said fourier plane and passing designated diffracted light which corresponds to a given applied electric field;
  wherein said spatial light modulator comprises a plurality of independently addressable pixels, such that each pixel is an independent phase grating; and
  wherein each of said pixels comprises electrodes with an intra-electrode pitch less than or equal to a wavelength of incident light divided by a numerical aperture of said incident light.

2. A printing system according to claim 1, wherein said spatial light modulator is a total internal reflection type modulator.

3. A printing system according to claim 2, wherein each of said pixels contains a diffraction grating of at least three grating periods.

4. A printing system according to claim 1, wherein said slit of said spatial filter has a shape of an hour glass.

5. A printing system according to claim 1, wherein a width of said slit of said spatial filter is sufficient to pass at least 65% of incident light therethrough.

6. A printing system according to claim 1, wherein said slit of said spatial filter has a width in a scan direction to permit a passage of zero and sufficient side orders to reconstruct a pixel on said image plane.

7. A printing system according to claim 1, wherein said slit of said spatial filter has a width in a scan direction to permit passage of zero and two additional side orders on each side to reconstruct a pixel on said image plane.

8. A printing system according to claim 1, wherein said slit of said spatial filter has a width in a scan direction to permit passage of zero and seven additional side orders on each side to reconstruct a pixel on said image plane.

9. A printing system according to claim 1, wherein said slit of said spatial filter has a width which corresponds to a spatial frequency of +/−0.015 cycles/μm.

10. A printing system according to claim 1, wherein said array illumination optics comprises a laser lenslet array and a field lens.

11. A printing system according to claim 1, wherein an interaction distance with respect to a pixel of said spatial light modulator is less than or equal to a pixel width divided by two times a numerical aperture at said spatial light modulator.

12. A printing system according to claim 11, wherein a beam waist of said light incident within said spatial light modulator passes through a penetration depth of the applied electric field, such that a substantial portion of said beam waist is within both said interaction length and said penetration depth.

13. A printing system according to claim 1, wherein a penetration depth of the applied electric field is such that a beam waist of said light within said spatial light modulator lies essentially within said electric field.

14. A printing system according to claim 13, wherein said interaction length is approximately within a range of 0.5–2.0 mm.

15. A printing system according to claim 1, wherein said applied electric field is sufficient to diffract light into at least a second order.

16. A printing system according to claim 1, wherein said light provides for a cross array beam full width of 25 micrometers or less within an interaction region of said spatial light modulator.

17. A printing system according to claim 1, wherein a pitch of electrodes on said spatial light modulator is within a range of 15–20 micrometers.

18. A printing system according to claim 1, wherein a width of said pixels are approximately within a range of 120–160 micrometers.

19. A printing system according to claim 1, wherein an array direction numerical aperture at said spatial light modulator is approximately 0.012.

20. A printing system as in claim 1 wherein said light is at an internal incidence angle of approximately 2 degrees to said modulator.

21. A printing system comprising:
a laser diode array having a plurality of multi-mode emitters;
a spatial light modulator which diffracts light from said laser diode array according to an applied electric field;
an optics assembly for providing light from said light source to said spatial light modulator;
an imaging lens having an internal fourier plane, said imaging lens imaging light from said spatial light modulator onto an image plane;
a spatial filter located in close proximity to said fourier plane and passing designated diffracted light which corresponds to a given applied electric field;
wherein said spatial light modulator comprises a plurality of independently addressable pixels, such that each pixel is an independent phase grating; and
wherein each of said pixels comprises electrodes with an intra-electrode pitch less than or equal to a wavelength of incident light divided by a numerical aperture of said incident light.

22. A printing method comprising the steps of:
focussing light from a laser diode array having a plurality of multi-mode emitters onto a spatial light modulator;
flood illuminating said spatial light modulator with said light from said laser diode array;
diffracting said light through said spatial light modulator according to an applied electric field;
passing designated diffracted light which corresponds to a given applied electric field through a spatial filter having a slit;
imaging said light onto an image plane;
wherein said spatial light modulator comprises a plurality of independently addressable pixels, such that each pixel is an independent phase grating; and
wherein each of said pixels comprises electrodes with an intra-electrode pitch less than or equal to a wavelength of incident light divided by a numerical aperture of said incident light.

23. A method according to claim 22, wherein said step of imaging said light onto an image plane comprises the step of imaging said light through an image lens positioned at an internal fourier plane.

24. A method according to claim 23, wherein said spatial filter is located in close proximity to said fourier plane.

25. A printing system comprising:
a laser diode array having a plurality of multimode emitters;
a transmissive phase grating spatial light modulator which diffracts light from said laser diode array according to an applied electric field;
array direction illumination optics for flood illuminating said spatial light modulator with light from said laser diode array;
cross array illumination optics for limiting divergence of incident light from said laser diode array and focusing said light onto said spatial light modulator;
an imaging lens having an internal fourier plane, said imaging lens imaging light from said spatial light modulator onto an image plane;
a spatial filter having a slit, said spatial filter being located in close proximity of said fourier plane and passing designated diffracted light which corresponds to a given electric field; and
wherein an interaction distance with respect to a pixel of said spatial light modulator is less than or equal to a pixel width divided by two times a numerical aperture at said spatial light modulator.

* * * * *